Oct. 16, 1962 T. F. HAWK ET AL 3,058,623
STORAGE BIN
Filed Nov. 4, 1959 2 Sheets-Sheet 2
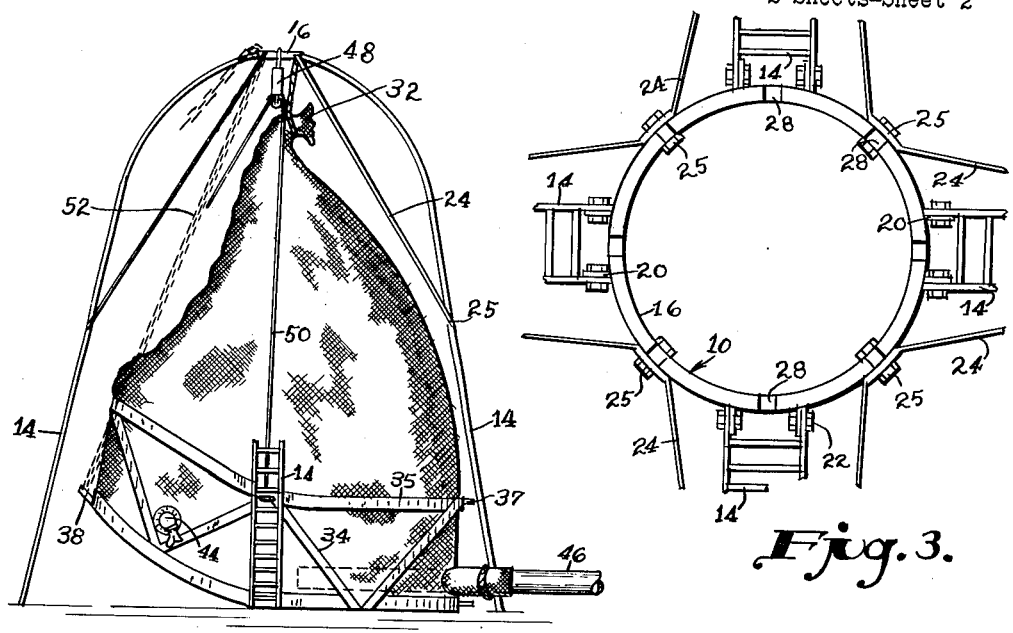
Fig. 3.
Fig. 6.
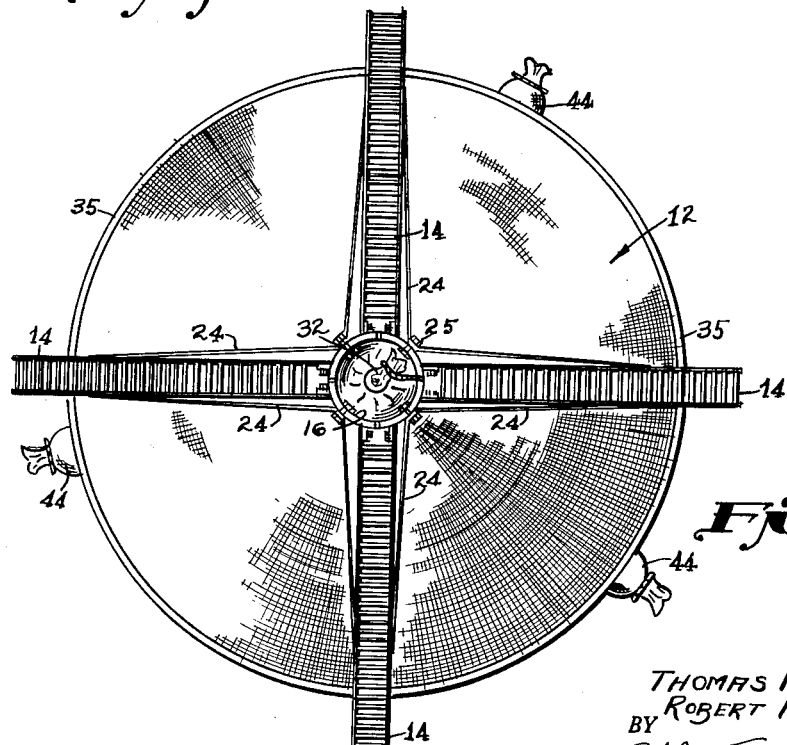
Fig. 2.
INVENTORS
THOMAS F. HAWK &
BY ROBERT H. HILL,
Schley, Trask & Jenkins
Attorneys.

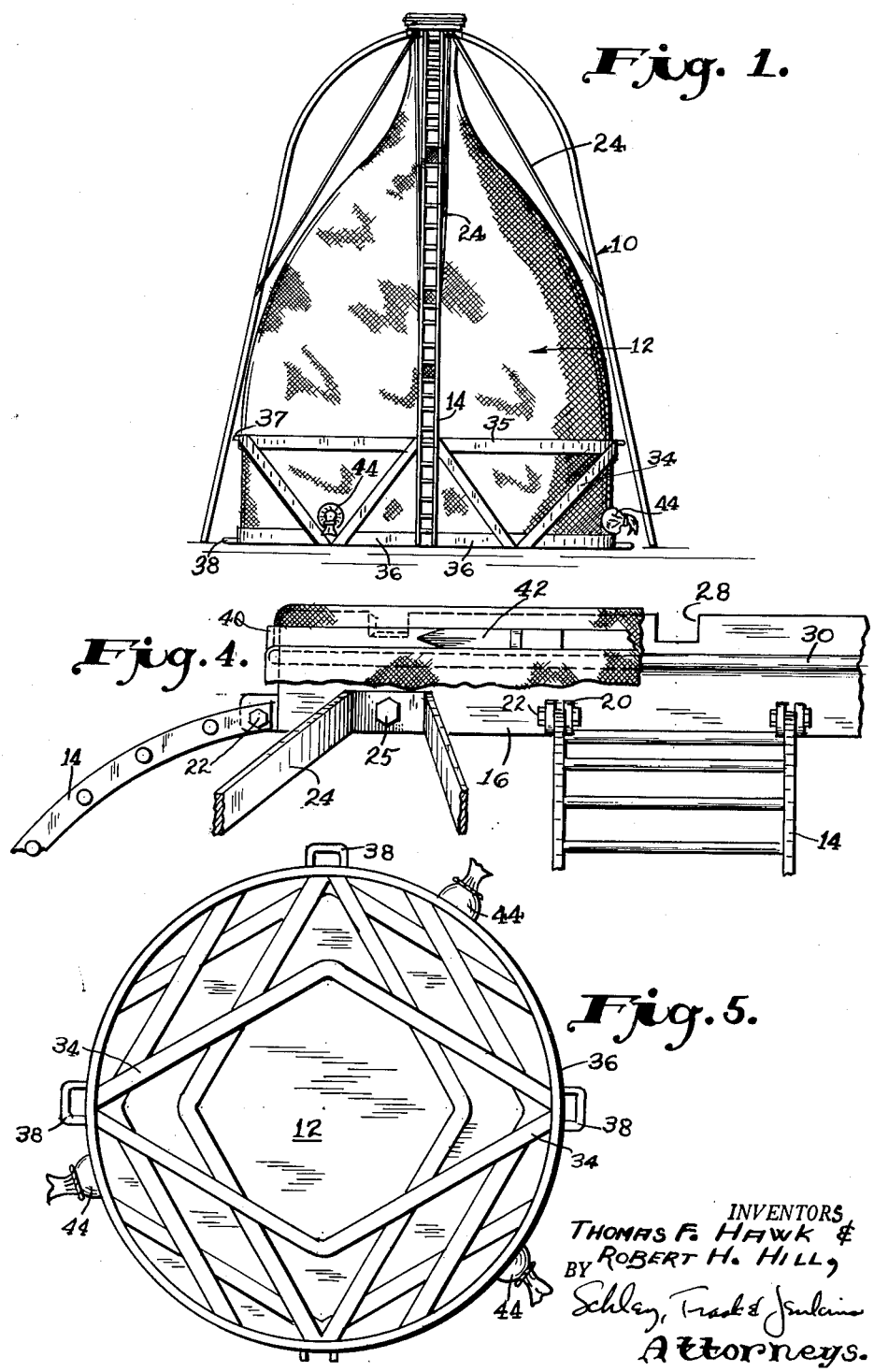

United States Patent Office 3,058,623
Patented Oct. 16, 1962

3,058,623
STORAGE BIN
Thomas F. Hawk, New Palestine, Ind., and Robert H. Hill, 26 N. Wayburn St., Cumberland 29, Ind.
Filed Nov. 4, 1959, Ser. No. 850,941
10 Claims. (Cl. 222—95)

This invention relates to a storage bin, and more particularly to a storage bin for grain.

It is an object of our invention to provide an inexpensive storage bin which can be easily assembled and disassembled for portability, which will provide an airtight storage facility, which can be easily filled, and which can be easily and completely emptied.

According to the preferred form of our invention, there is provided a generally conically shaped supporting frame comprising a plurality of upright ground-engageable frame members connected at their upper ends to a ring carried in an elevated position above the ground. A flexible bag having a generally conically shaped configuration is disposed between the frame members with its base adapted to rest on the ground and its upper end, or neck, carried from said ring. Desirably, the bag neck may be supported from the ring both in an open position for filling the bag and a closed position to provide an air-tight environment for the grain stored in the bag.

Conveniently, the lower end of the bag is provided with flexible bracing and strengthening means. A plurality of spaced rings are mounted on said bracing means for interconnecting the lower end of said bag to the ring supported on the frame members. Conveniently, such interconnection may be provided by adjustable means for selectively lifting portions of the lower end of the bag to cause the grain in said bag to flow toward the desired position in the bag. Desirably, one or more closeable sleeves extend outwardly from the bag adjacent its lower end to provide a means for withdrawing the grain therefrom.

The accompanying drawings illustrate our invention. In such drawings:

FIG. 1 is a side elevation of a storage bin embodying our invention;

FIG. 2 is a top plan view of the storage bin shown in FIG. 1, but showing the bag in storage position;

FIG. 3 is an enlarged fragmentary plan view of the supporting frame;

FIG. 4 is an enlarged fragmentary side elevation of the supporting frame shown in FIG. 3, but with the bag connected thereto in a filling position;

FIG. 5 is a bottom plan view of the bag shown in FIG. 1; and

FIG. 6 is a side elevation of the storage bin shown in FIG. 1, but showing said bin in position for removing the stored grain therefrom.

As shown, our invention provides a storage bin for grain which may be easily and quickly assembled and disassembled for ease of portability, thereby making it possible for a farmer to easily set up a storage bin in the immediate area of the harvested crop. It further provides an air-tight storage for high moisture grain to prevent said grain from molding.

As shown in FIG. 1, our storage bin comprises an easily erected supporting frame 10 adapted to support a flexible bag 12 housing the grain to be stored. The generally conically shaped supporting frame is formed by a plurality of pairs of opposed ladders 14 whose upper ends curve inwardly for connection to a ring 16 supported in an elevated position above the ground on said ladders. Desirably, the ladders are connected to the ring by bolts 22 extending through the ladder legs and pairs of lugs 20 projecting outwardly from the ring 16 adjacent its lower edge. The ring and ladders are further interconnected and cross-braced by a plurality of generally U-shaped braces 24 connected to the adjacent legs of adjacent ladders and to the outer face of the ring 16 adjacent its lower edge. Conveniently, the braces 24 are connected to said ring and the ladder legs by bolts 25 to facilitate assembly and disassembly of the supporting frame. For reasons that will become more apparent hereinafter, a plurality of spaced slots 28 are formed in the upper edge of the ring 16, and the outer face of said ring is provided with an annularly extending rib 30 interposed between the bottom edges of said slots and the connections between the ring and the braces 24 and ladders 14.

As shown in the drawings, the supporting frame 10 is adapted to support a flexible bag 12 having a generally conical shape. Desirably, the bag is of a size and shape such that it substantially fills the area within the extent of the ladders 14 with its base resting on the ground and its upper end or neck 32 being supported from the ring 16. As shown in FIGS. 1 and 5, a plurality of obliquely extending straps 34 are mounted on the bag along its bottom and side walls. The lower portion of the bag is further provided with a pair of vertically spaced flexible straps 35 and 36 extending circumferentially around the bag side walls adjacent their lower ends. As will be understood, the straps 34—36 strengthen and brace the lower end of the bag 12, while still permitting the bag to retain its flexibility. Mounted at spaced intervals along the vertically spaced straps 35 and 36 are pluralities of rings 37 and 38.

To mount the bag 12 on the supporting frame 10, the supporting frame is first erected, and the bag 12 is disposed within the extent of the frame ladders 14 with its base resting on the ground. The bag neck 32 is drawn upwardly through the ring 16 and folded thereover to open said neck for filling the bag 12. To hold the neck 32 in this open position, we provide an annular clamp 40 conveniently provided with a toggle latch 42 so that upon closing the latch 42 the clamp 40 will be drawn up against the bag neck 32 to bindingly retain said neck in an open position against the outer face of the ring 16. As shown in FIG. 4, the rib 30 on the ring 16 holds the clamp 40 in the desired locking position on the ring 16 to bindingly retain the bag neck against the outer face of the ring between the lower edges of the slots 28 and the lugs 20. With the bag neck 32 thus disposed in open position on the ring 16, the bag 12 may be filled with grain in any convenient manner. After the bag has been filled, the clamp 40 is removed and the neck 32 of the bag is tied off, as by a rope, and supported from the ring 16, as shown in FIG. 2, thereby closing said bag to provide airtight storage for the grain retained therein.

In order to remove the grain from the bag 12, a plurality of flexible closable sleeves 44 extend outwardly from the bag adjacent its lower end. As shown in FIG. 6, the sleeves 44 are adapted to receive an auger 46 insertable into the bag for withdrawing the grain therefrom. Desirably, the sleeves 44 when not in use may be tied off, as shown in FIG. 2, to prevent the grain from flowing out through said sleeves, and to further insure an air-tight storage for high moisture grain. When the auger 46 is inserted into the bag through one of the sleeves 44, as shown in FIG. 6, the sleeve is tied around the auger casing to prevent the grain from flowing between the sleeve and the casing.

Free flowing grain has a natural tendency to form itself into a conically shaped pile. This, of course, makes it difficult to remove the last few bushels of grain in the bag. To overcome this difficulty, selected portions of the lower end of the bag 12 may be lifted so as to cause the grain in the bag to flow toward the auger. As shown in FIG. 6, this is accomplished by mounting a block and tackle 48 on the ring 16, and then hooking the hoisting rope 50 into one of the pluralities of rings 37 or 38 for lifting a portion of the lower end of the bag. When the bag has been thus lifted, a chain 52 may be substituted for the block and tackle 48 to free said block and tackle to raise another portion of the bag. As shown in FIG. 6, when such a substitution is made, the lower end of the chain 52 is hooked in one of the rings 37 or 38 while the lower end of the bag is in raised position, and the upper end of the chain is placed in one of the slots 28 formed in the ring 16. Conveniently, the slots 28 have a width sufficient that they will receive one of the chain links to hold the upper end of said chain in a fixed position on the ring 16. In this manner, by being able to selectively raise various portions of the lower end of the bag the grain in said bag may be caused to flow toward the auger 46 to permit all of the grain in the bag to be removed therefrom.

It is to be understood, of course, that the auger 46 merely expedites the emptying of the bag 12. The bag may, if desired, be emptied merely by opening one or more of the sleeves 44 to permit the grain to flow out of the bag by gravity—the various lower bag areas being raised in the manner previously described to cause the last several bushels of grain to flow toward and out of the open sleeve or sleeves.

We claim as our invention:

1. A storage bin for granular type materials, comprising a plurality of ground-engageable upright frame members rigidly connected at their upper ends to a supporting ring, a flexible ground-engaging bag having its neck portion connected to said ring for supporting the upper end of said bag within the extent of said frame members, means for supporting said neck portion on said ring in open and closed positions, flexible bracing means mounted on the lower portion of said bag, lifting means interconnecting said bracing means to said ring, and a closable sleeve on a side wall of said bag adjacent its lower end for removing the contents of the bag therefrom, said lifting means selectively lifting peripheral portions of the lower end of the bag to cause the material in said bag to flow toward said sleeve.

2. A storage bin for granular type materials, comprising a plurality of ground-engageable upwardly converging frame members, a supporting ring carried on the upper ends of said frame members, a ground engaging, generally conically shaped, flexible bag having its neck portion connected to said ring for supporting the upper end of said bag within the extent of said frame members, means for supporting said neck portion on said ring in open and closed positions, flexible bracing means mounted on the lower portion of said bag, lifting means interconnecting said bracing means and said ring, and a closable sleeve on a side wall of said bag adjacent its lower end for removing the contents of the bag therefrom, said lifting means selectively lifting circumferential portions of the lower end of the bag to cause the material in said bag to flow toward said sleeve.

3. A storage bin for granular type materials, comprising a plurality of ground-engageable upwardly converging ladders having their upper ends rigidly connected to a supporting ring, a plurality of braces interconnecting said ring and ladders, a ground-engaging, generally conically shaped, flexible bag having its neck portion connected to said ring for supporting the upper end of said bag within the extent of said ladders, means for supporting said neck portion on said ring in open and closed positions, flexible bracing means mounted on the lower portion of said bag, lifting means interconnecting the lower end of said bag and said ring, and a closable sleeve on a side wall of said bag adjacent its lower end for removing the contents of the bag therefrom, said lifting means selectively lifting circumferential portions of the lower end of the bag to cause the material in said bag to flow toward said sleeve.

4. A storage bin as set forth in claim 3 in which said ladders are disposed about said ring in opposed pairs.

5. A storage bin for granular type materials, comprising a plurality of ground-engageable upright frame members connected at their upper ends to a supporting ring, a generally conically shaped, flexible, ground-engaging bag having its neck portion connected to said ring for supporting the upper end of said bag within the extent of said frame members, means for supporting said neck portion on said ring in open and closed position, a plurality of flexible reinforcing straps on the bottom wall and lower side walls of said bag for strengthening the same, a plurality of circumferentially spaced members on said straps, lifting means selectively interconnecting said circumferentially spaced members to said ring, and a closable sleeve on a side wall of said bag adjacent its lower end for removing the contents of the bag therefrom, said lifting means selectively lifting circumferential portions of the lower end of said bag to cause the material in said bag to flow toward said sleeve.

6. A storage bin as set forth in claim 5 in which the members on said straps are disposed in a pair of vertically spaced horizontal planes on said bag, one plane being disposed adjacent the bottom wall of the bag and the other plane being disposed substantially above the bottom bag wall.

7. A storage bin for granular type of materials, comprising a plurality of upwardly converging, ground-engageable frame members connected at their upper ends to a supporting ring disposed in an elevated position on the vertical axis of the frame formed by said members, a flexible generally conically shaped bag carried within the extent of said frame members adapted to have its lower end connected to the ground and its upper end supported on said ring, means on said ring for supporting the upper end of said bag in a closed position and an open bag-filling position, flexible bracing means mounted on the lower portion of said bag, lifting means interconnecting said bracing means to said ring, and a plurality of circumferentially spaced sleeves on the side walls of said bag adjacent its lower end for removing the contents of the bag therefrom, said lifting means selectively lifting circumferential portions of the lower end of said bag to cause the material in said bag to flow toward one or more of said sleeves.

8. A storage bin as set forth in claim 7 in which said means for supporting the bag in said open bag-filling position comprises binding means receivable around said ring for releasably holding the neck of the bag against said ring in an open position.

9. A storage bin as set forth in claim 8 with the addition that the outer face of said ring is provided with an annularly extending rib for locating and positioning said binding means on the ring in a position above the plane of the connections between the ring and the frame members.

10. A storage bin for granular type of materials, comprising a plurality of ground-engageable upright ground-engaging frame members converging toward each other at their upper ends, an annular ring rigidly mounted on the upper ends of said frame members, said ring having a plurality of spaced slots formed in its upper edge and an annularly extending rib interposed between said slots and the connections between the ring and frame members, a flexible, ground-engaging bag disposed within the extent of said frame members and selectively carried from said ring in an open filling position and a closed storage and emptying position, a clamp receivable around said ring for bindingly retaining the bag neck thereon in said open position, said rib locating the clamp on said ring between its frame member connections and the lower edges of said slots, flexible bracing means mounted on the lower portion of said bag, lifting means selectively and operatively connected to said bracing means and receivable in said slots, and a closable sleeve on a side wall of said bag adjacent its lower end for removing the contents of the bag therefrom, said lifting means selectively lifting circumferential portions of the lower end of said bag to cause the material in said bag to flow toward said sleeve.

References Cited in the file of this patent

UNITED STATES PATENTS

| | | |
|---|---|---|
| 1,308,263 | Smith | July 1, 1919 |
| 1,335,607 | Salisbury | Mar. 30, 1920 |
| 2,405,453 | Savage | Aug. 6, 1946 |
| 2,496,757 | Sieling | Feb. 7, 1950 |
| 2,831,610 | Dennie | Apr. 22, 1958 |
| 2,858,051 | Cunningham | Oct. 28, 1958 |

OTHER REFERENCES

Water Supply and Water Purification Technical Manual, War Dept. TM 5–294, 1942, page 113.